(12) United States Patent
Hofmann et al.

(10) Patent No.: US 7,909,401 B2
(45) Date of Patent: Mar. 22, 2011

(54) DEVICE FOR ADJUSTING THE SEAT DEPTH OF A MOTOR VEHICLE SEAT

(75) Inventors: Jochen Hofmann, Marktgraitz (DE); Gregor Kröner, Bischberg (DE)

(73) Assignee: Brose Fahrzeugteile GmbH & Co KG, Coburg, Coburg (DE)

( * ) Notice: Subject to any disclaimer, the term of this patent is extended or adjusted under 35 U.S.C. 154(b) by 105 days.

(21) Appl. No.: 12/223,629

(22) PCT Filed: Feb. 8, 2007

(86) PCT No.: PCT/EP2007/001072
§ 371 (c)(1),
(2), (4) Date: Aug. 25, 2008

(87) PCT Pub. No.: WO2007/090642
PCT Pub. Date: Aug. 16, 2007

(65) Prior Publication Data
US 2009/0033134 A1 Feb. 5, 2009

(30) Foreign Application Priority Data
Feb. 8, 2006 (DE) .................... 20 2006 001 969 U

(51) Int. Cl.
*A47C 3/00* (2006.01)
(52) U.S. Cl. .................................................. 297/284.11
(58) Field of Classification Search .............. 297/284.11, 297/311
See application file for complete search history.

(56) References Cited

U.S. PATENT DOCUMENTS

| 4,915,447 | A  | * | 4/1990 | Shovar ..................... 297/284.11 |
| 6,419,317 | B1 | * | 7/2002 | Westrich et al. ......... 297/284.11 |
| 6,926,361 | B2 | * | 8/2005 | Link .............................. 297/337 |
| 6,994,400 | B2 | * | 2/2006 | Koepke et al. ................ 297/337 |
| 7,571,964 | B2 | * | 8/2009 | Taniguchi et al. ........ 297/423.36 |
| 7,578,554 | B2 | * | 8/2009 | Lee et al. ................. 297/284.11 |

FOREIGN PATENT DOCUMENTS

| DE | 41 04 697 A1 | 8/1992 |
| DE | 43 39 114 A1 | 5/1995 |
| DE | 101 12 918 A1 | 10/2002 |
| DE | 102 22 995 C1 | 6/2003 |
| GB | 2 252 723 A | 8/1992 |

OTHER PUBLICATIONS

English translation of International Preliminary Report on Patentability dated Sep. 18, 2008 for corresponding PCT application No. PCT/EP2007/001072.
International Search Report dated Jan. 6, 2007, corresponding to PCT/EP2007/001072.

* cited by examiner

*Primary Examiner* — Sarah B McPartlin
(74) *Attorney, Agent, or Firm* — Christie, Parker & Hale LLP

(57) ABSTRACT

A device for adjusting the seat depth of a motor vehicle seat includes a seat depth adjustment part which is movable relative to a seat lower part of the motor vehicle seat substantially in the direction of travel, an adjusting unit for the seat depth adjustment part as well as a guide device for cushion material covering the seat depth adjustment part. The adjustment unit for the seat depth adjustment part as well as the guide device for the cushion material form one unit.

11 Claims, 17 Drawing Sheets

DEVICE FOR ADJUSTING THE SEAT DEPTH OF A MOTOR VEHICLE SEAT

CROSS-REFERENCE TO A RELATED APPLICATION

This application is a National Phase Patent Application of International Patent Application Number PCT/EP2007/001072, filed on Feb. 8, 2007, which claims priority of German Utility Model Application Number 20 2006 001 969.3, filed on Feb. 8, 2006.

BACKGROUND

The invention relates to a device for adjusting the seat depth of a motor vehicle seat.

An adjusting drive is known from DE 102 22 995 C1 for a seat depth adjusting region which is displaceable via guide rods relative to a region which is fixed to a motor vehicle seat and supporting the upper leg region of a vehicle occupant, which comprises a threaded sleeve comprising an internal thread and an external thread, which is in engagement with a spindle nut, whilst the internal thread is connected to a threaded spindle.

A vehicle seat is known from DE 101 12 918 A1 comprising a seat backrest and a seat part, which comprises a seat lower frame, a seat pan connected to the seat lower frame and bearing a seat cushion and a seat depth adjustment part guided on the seat pan and adjustable relative to the seat pan by means of a seat depth adjusting device, which is covered by cushion material, which is guided in the direction of adjustment by means of a guide device with double the adjustment path of the adjustment path of the seat depth adjustment part.

SUMMARY

It is the object of the present invention to provide a device for adjusting the seat depth of a motor vehicle seat, which may be easily assembled and in particular preassembled, which is of compact construction and may be adapted in a simple manner to the respective conditions of a motor vehicle seat.

It is provided according to an exemplary embodiment of the invention that the adjusting unit driving the seat depth adjustment part, as well as the guide device for the cushion material form one unit. As a result of the structural and functional unit of the adjusting unit for the seat depth adjustment part and the guide device for the cushion material, the seat depth adjuster of the motor vehicle seat may be preassembled in a simple manner, may be of very compact construction and easily adaptable to the conditions of a motor vehicle seat.

Exemplary, the adjusting unit for the seat depth adjustment part comprises a housing which is attached in a linear movable manner beneath the seat lower part configured as a seat pan and is connected to the seat depth adjustment part.

As a result of this exemplary embodiment of the adjusting unit for the seat depth adjustment part, a protected arrangement of the adjusting elements of the adjusting unit is ensured and at the same time there is the provision to integrate parts of the housing into the adjusting mechanism.

The seat depth adjustment part comprises a first adjustment part surface extending in the plane of the vehicle longitudinal axis or X-axis and the vehicle transverse axis or Y-axis, and a second adjustment part surface bent back substantially at right angles from the first adjustment part surface, which extends in the plane of the vehicle transverse axis or Y-axis and vehicle vertical axis or Z-axis and is connected via connecting elements to the housing.

This exemplary embodiment of the seat depth adjustment part and the connection thereof to the housing of the adjusting unit for the seat depth adjustment part allows a space-saving arrangement of the adjusting unit and the connection thereof to the seat depth adjustment part by simultaneous use of the two adjustment part surfaces, as a housing wall of the adjusting unit, forming the seat depth adjustment part.

By the design of the guide device for the cushion material as a plate attached in a linear movable manner to the underside of the housing of the adjusting unit, a close association of the adjusting unit and the guide device for the cushion material is ensured for the compact design of the seat depth adjusting device.

In order to guide the cushion material in a tension-free manner, when adjusting the seat depth, the guide device for the cushion material configured as a plate comprises a hole toothing which meshes with a pinion rotatably mounted in the housing, which simultaneously engages in teeth which are fixed relative to the seat pan, such that with a movement of the housing the pinion is rotated and by its engagement in the hole toothing the plate of the guide device for the cushion material containing the hole toothing covers double the path of the adjustment path of the adjusting unit.

For adjusting the seat depth adjustment part, the housing of the adjusting unit is connected to a motor which drives a spindle adjusting the housing, which cooperates with a spindle nut which is arranged with a spindle nut receiver attached to the seat lower part and/or to the seat pan, the fixed teeth cooperating with the pinion being arranged on the underside thereof.

This integration of the drive device of the adjusting unit in the housing and the operative connection thereof both to the plate of the guide device for the cushion material arranged in a linear movable manner on the underside of the housing and to the fixed teeth, assists the compact design of the seat depth adjuster, with at the same time simple assembly.

Exemplary, the housing of the adjusting unit is suspended in a guide plate attached below the seat lower part and/or the seat pan and guiding the housing in the longitudinal direction of the vehicle (X-axis).

The guide plate connected to the seat lower part and/or the seat pan serves both for guiding the housing and thus the seat depth adjustment part in the longitudinal direction of the vehicle and also receiving the housing and thus the connection between the seat depth adjustment part and the adjusting unit.

Exemplary, the housing comprises at the upper ends of its side walls bent-back projections, which are encompassed by lateral guides of the guide plate extending in the longitudinal direction of the vehicle.

BRIEF DESCRIPTION OF THE DRAWINGS

With reference to an embodiment shown in the figures of the drawings, the invention and the idea underlying the invention are intended to be described in more detail, in which.

DETAILED DESCRIPTION

Figure 1:
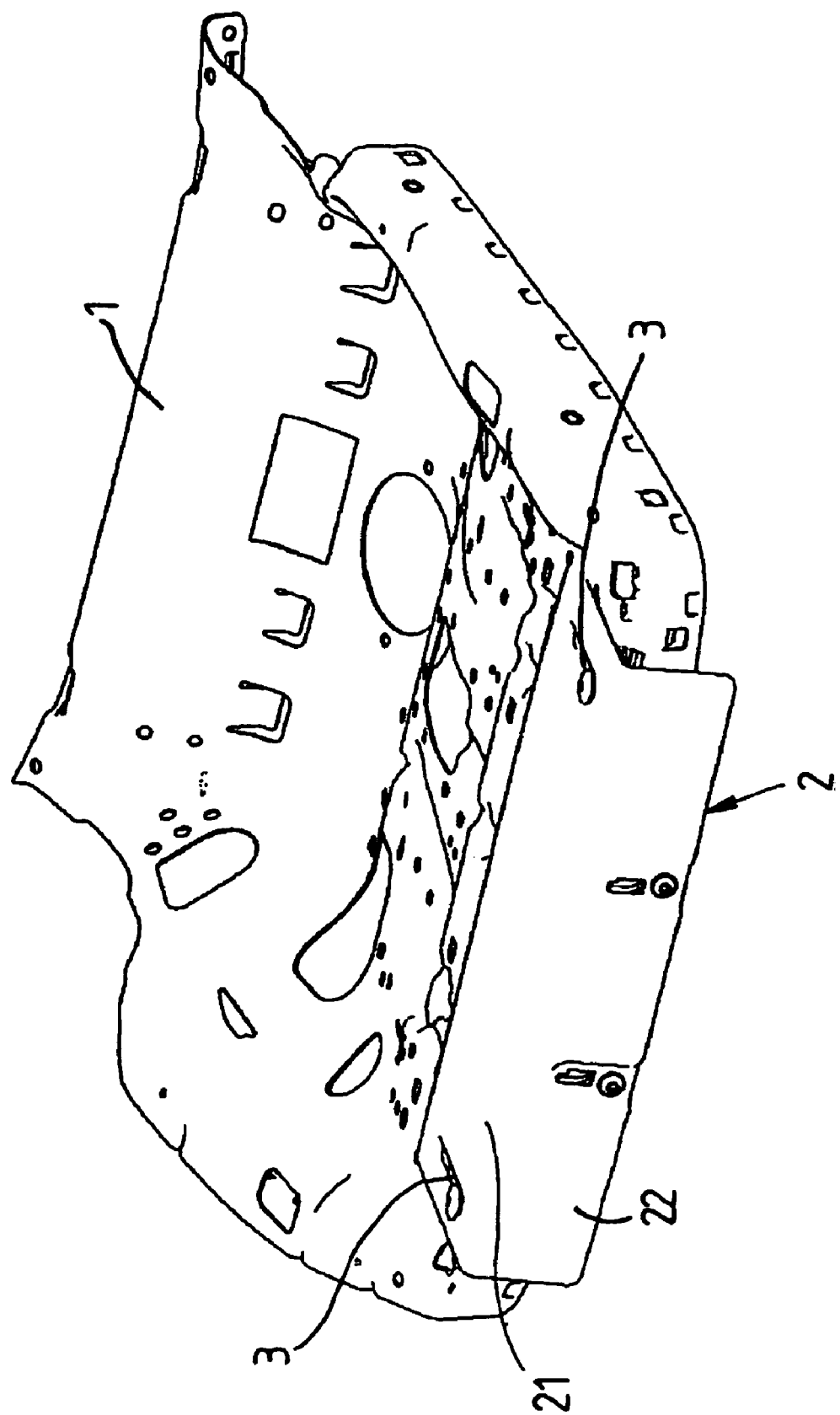
FIG. 1 shows an isometric view from the upper face of a seat lower part configured as a seat pan comprising a seat depth adjuster.
Figure 2:
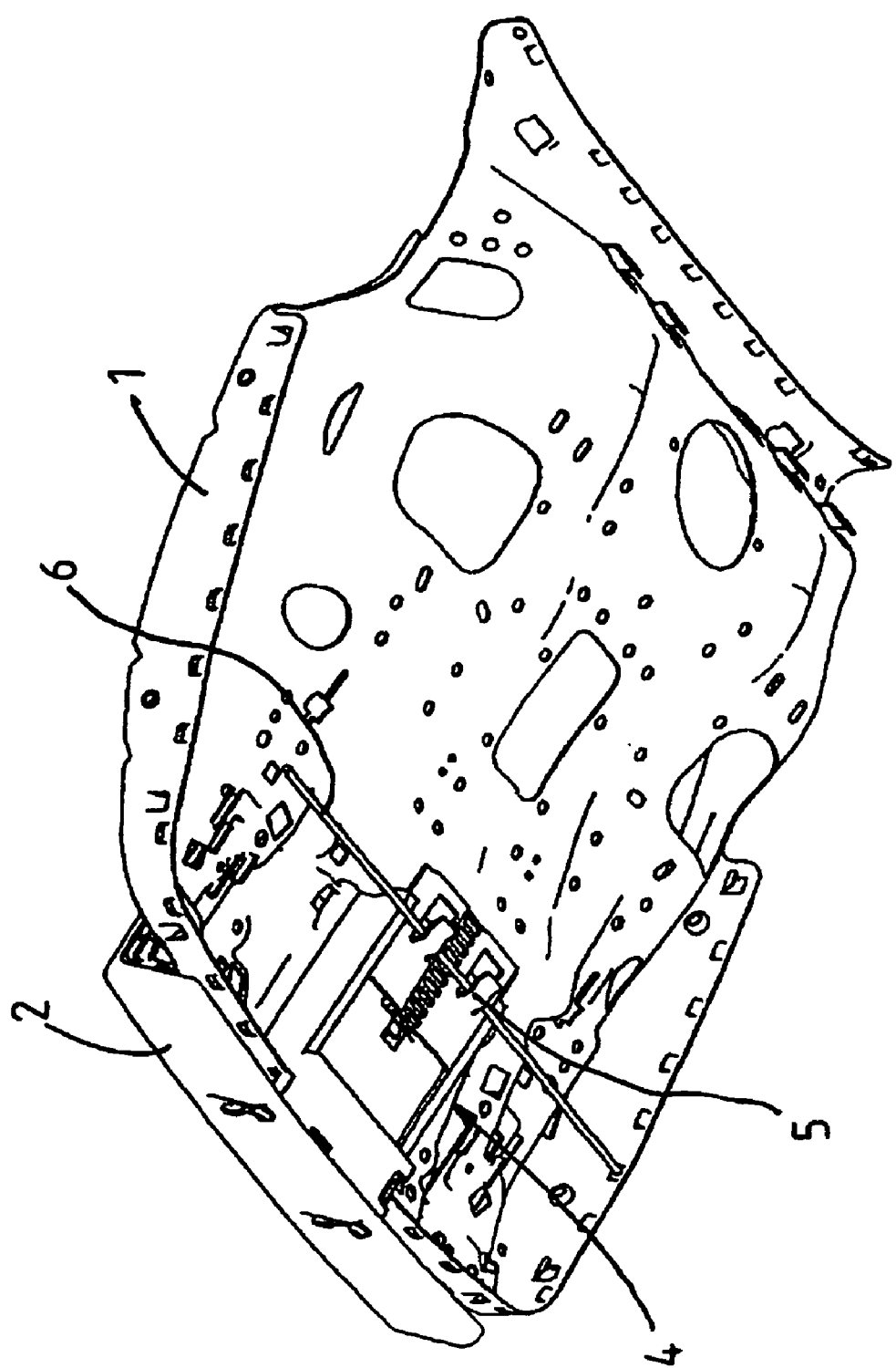
FIG. 2 shows an isometric view from the lower face of a seat lower part configured as a seat pan comprising a seat depth adjuster.

In FIGS. 1 and 2 a seat lower part configured as a seat pan 1 is shown in isometric view from the upper and lower face of a motor vehicle seat with a seat depth adjustment part 2 of a seat depth adjuster articulated on the front edge. The seat depth adjustment part 2 has a horizontal adjustment part surface 21 extending substantially in the plane of the vehicle longitudinal axis or X-axis and the vehicle transverse axis or Y-axis from which a vertical adjustment part surface 22 is bent back substantially at right angles, which extends in the plane of the vehicle transverse axis or Y-axis and vehicle vertical axis or Z-axis and forms the front edge of the seat depth adjustment part 2 of the seat depth adjuster whilst the horizontal adjustment part surface 21 forms a seat surface extension of the seat pan 1.

The horizontal adjustment part surface 21 of the seat depth adjustment part 2 has, extending in the direction of the vehicle longitudinal axis or X-axis, guide receivers of a linear guide 3 which are arranged adjacent to the side walls of the seat pan 1, so that the seat depth adjustment part 2 may be substantially horizontally adjusted on both sides relative to the seat pan 1.

The horizontal adjustment of the seat depth adjustment part 2 relative to the seat pan 1 takes place via an adjusting unit 4 arranged on the underside of the seat pan 1, on the underside thereof a guide device 5 being arranged for cushion material for upholstering the motor vehicle seat. One end of the cushion material covering the seat depth adjustment part 2 and not shown in more detail is connected to a rod 6 of the guide device 5 for the cushion material and guided via the vertical adjustment part surface 22 and horizontal adjustment part surface 21 of the seat depth adjustment part 2.

Figure 3:
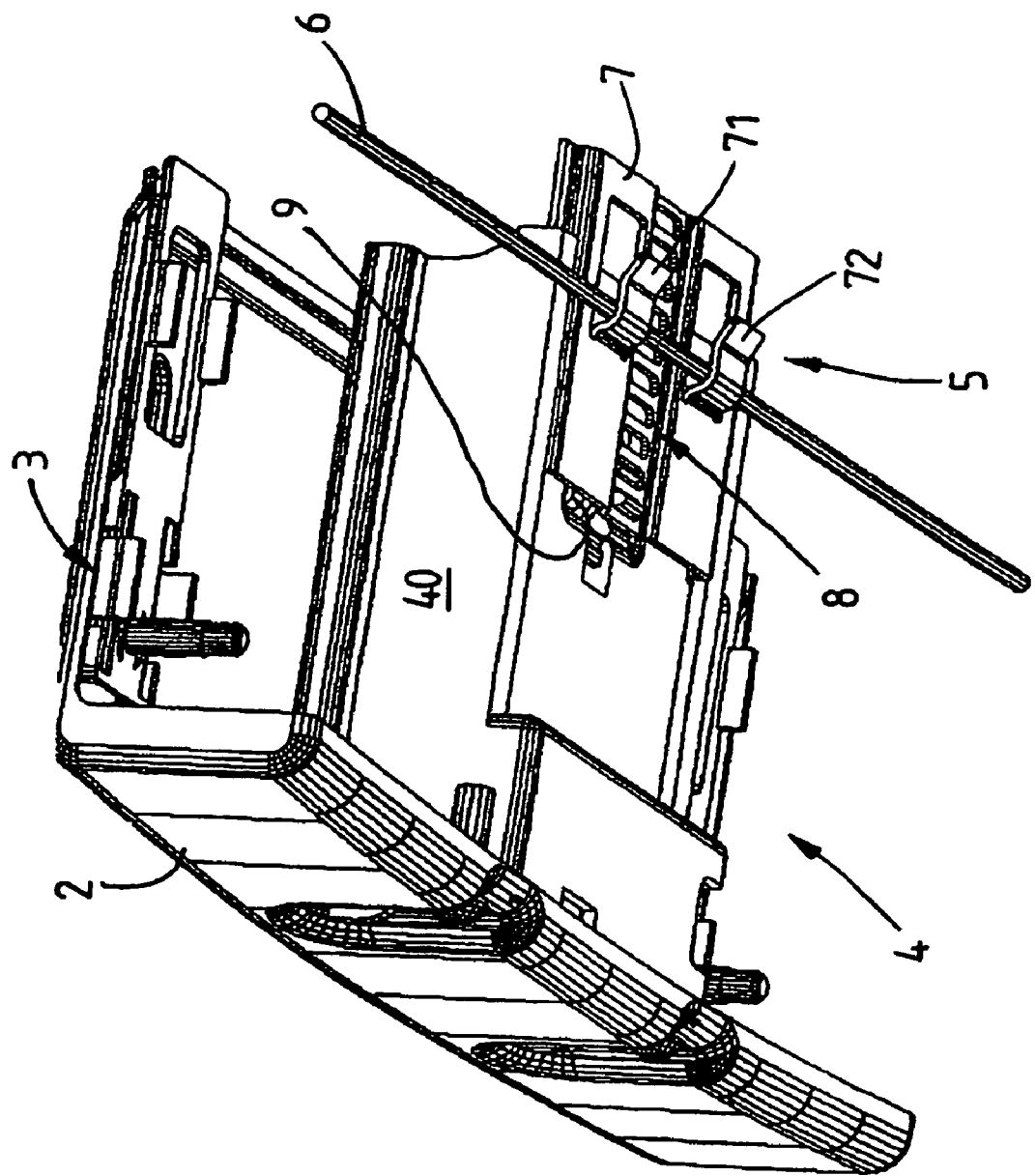
FIG. 3 shows an isometric view of the seat depth adjustment part, the adjusting unit and the guide device for the cushion material from the underside of a motor vehicle seat.
Figure 4:
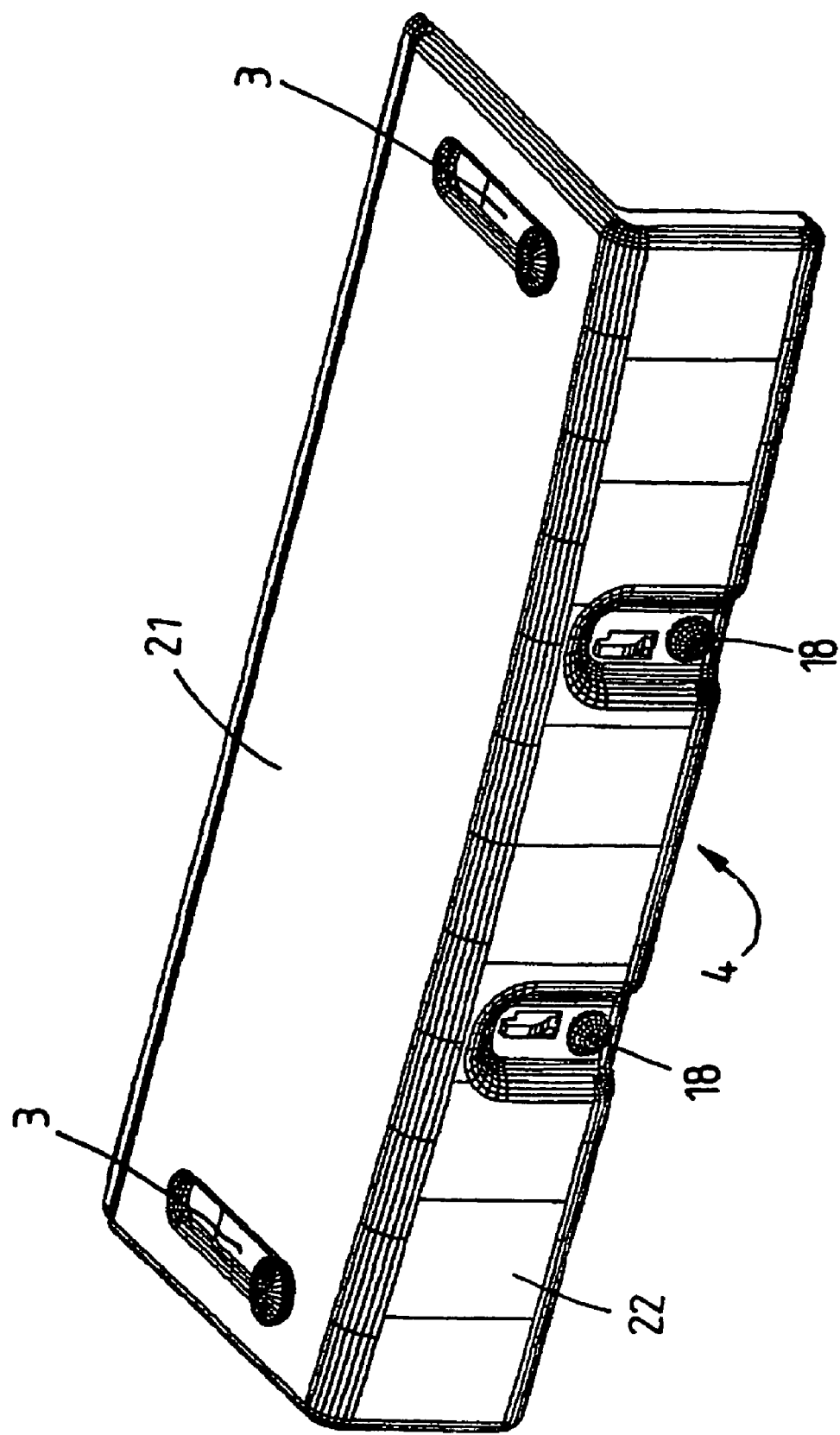
FIG. 4 shows an isometric view of the seat depth adjustment part and the adjusting unit of the seat depth adjuster.
Figure 5:
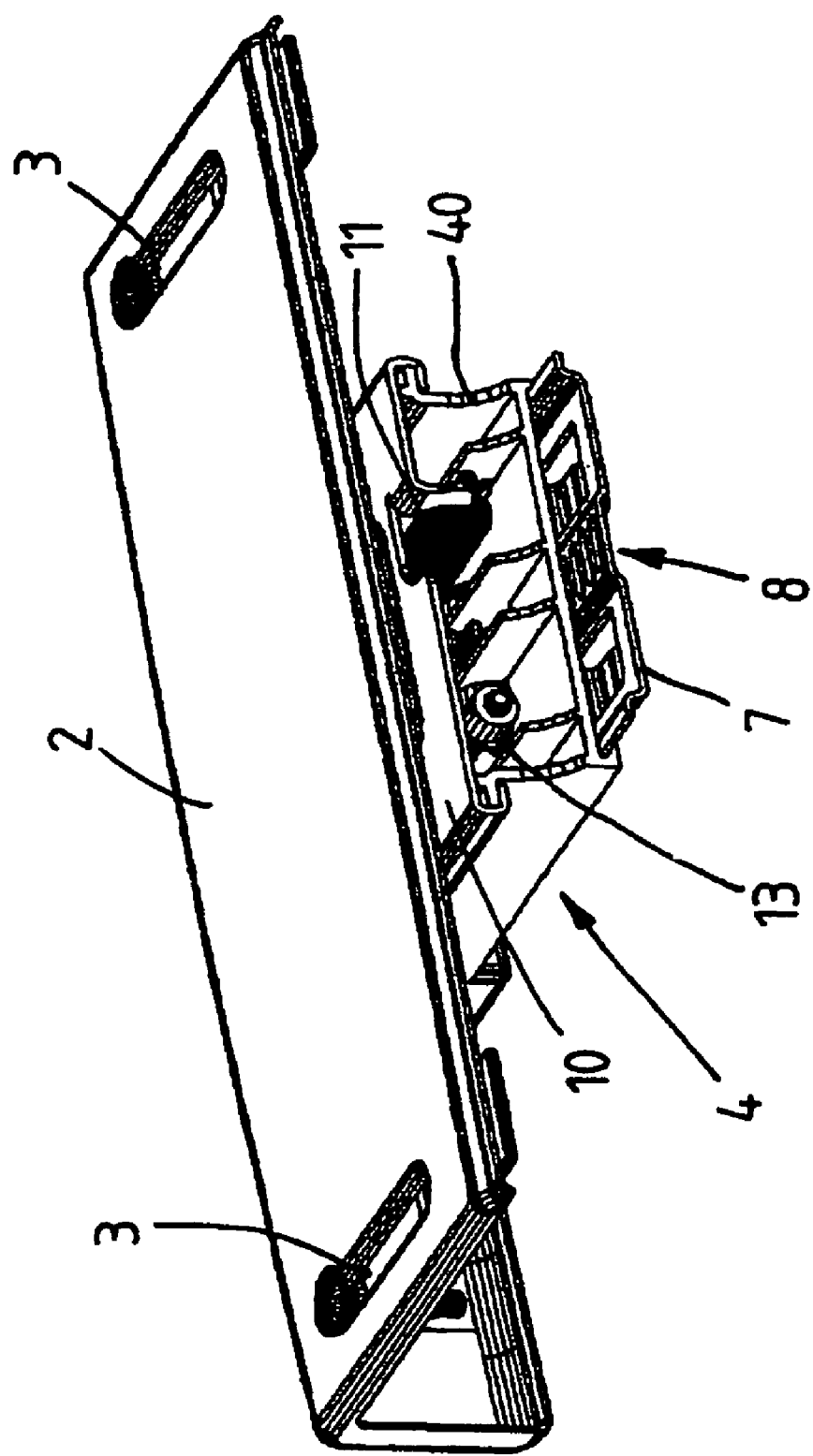
FIG. 5 shows an isometric view of the seat depth adjustment part and the adjusting unit of the seat depth adjuster.
Figure 6:
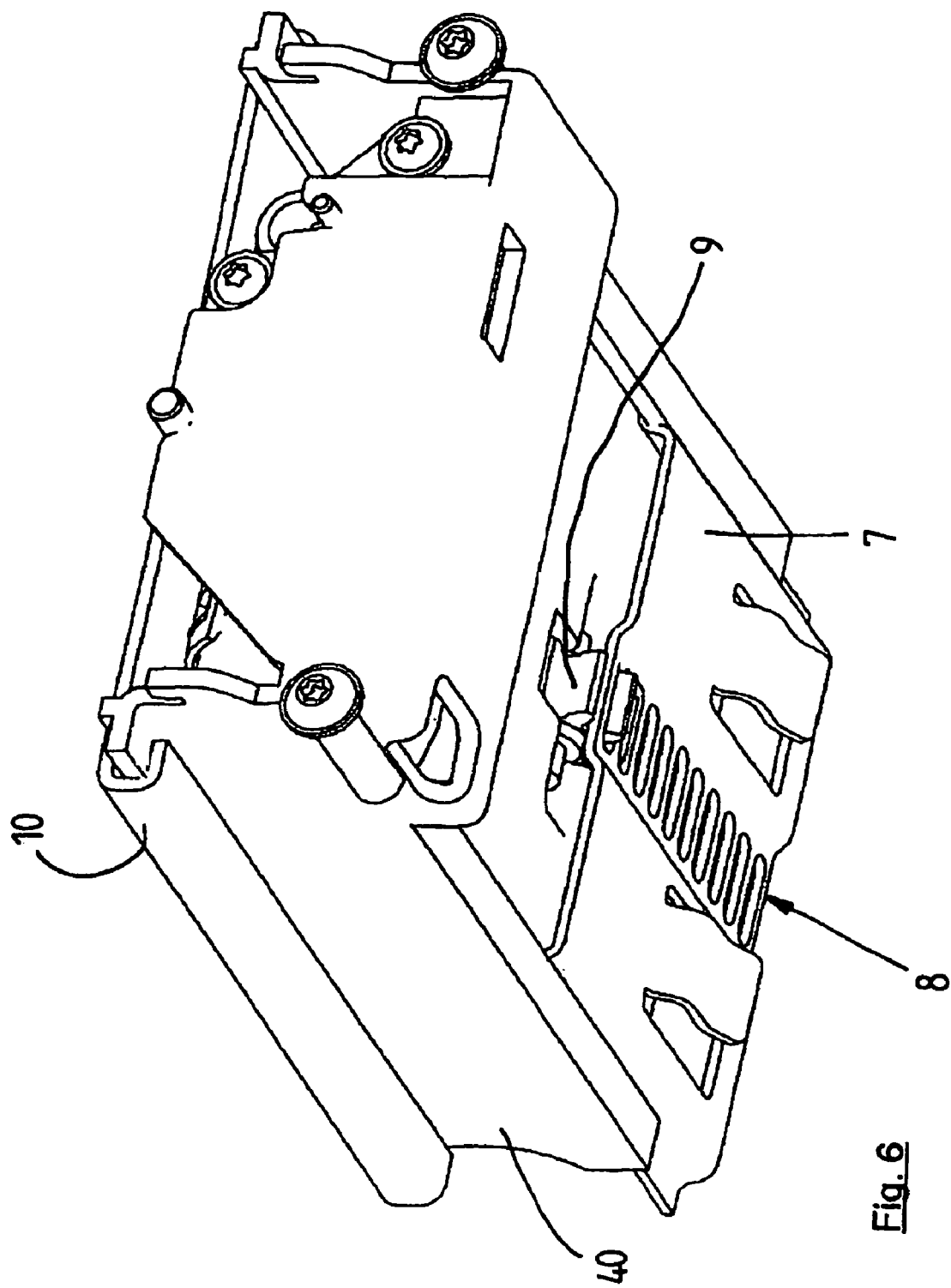
FIG. 6 shows an isometric view of the housing of the adjusting unit suspended in a guide plate with a part of the adjusting mechanism.
Figure 7:
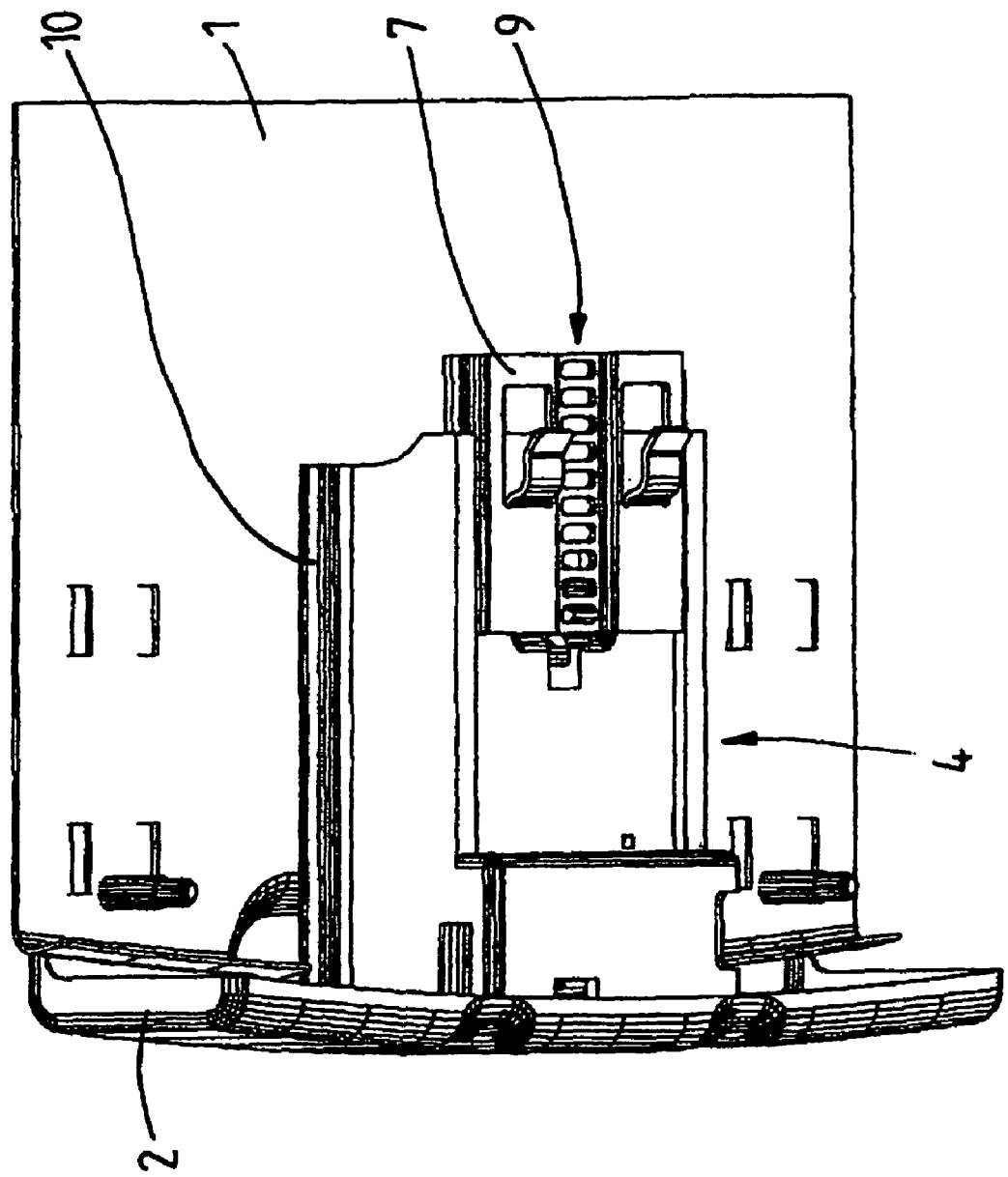
FIG. 7 shows an isometric view of the seat depth adjustment part, the guide plate and the adjusting unit from the underside, with the seat depth adjustment part retracted.
Figure 8:
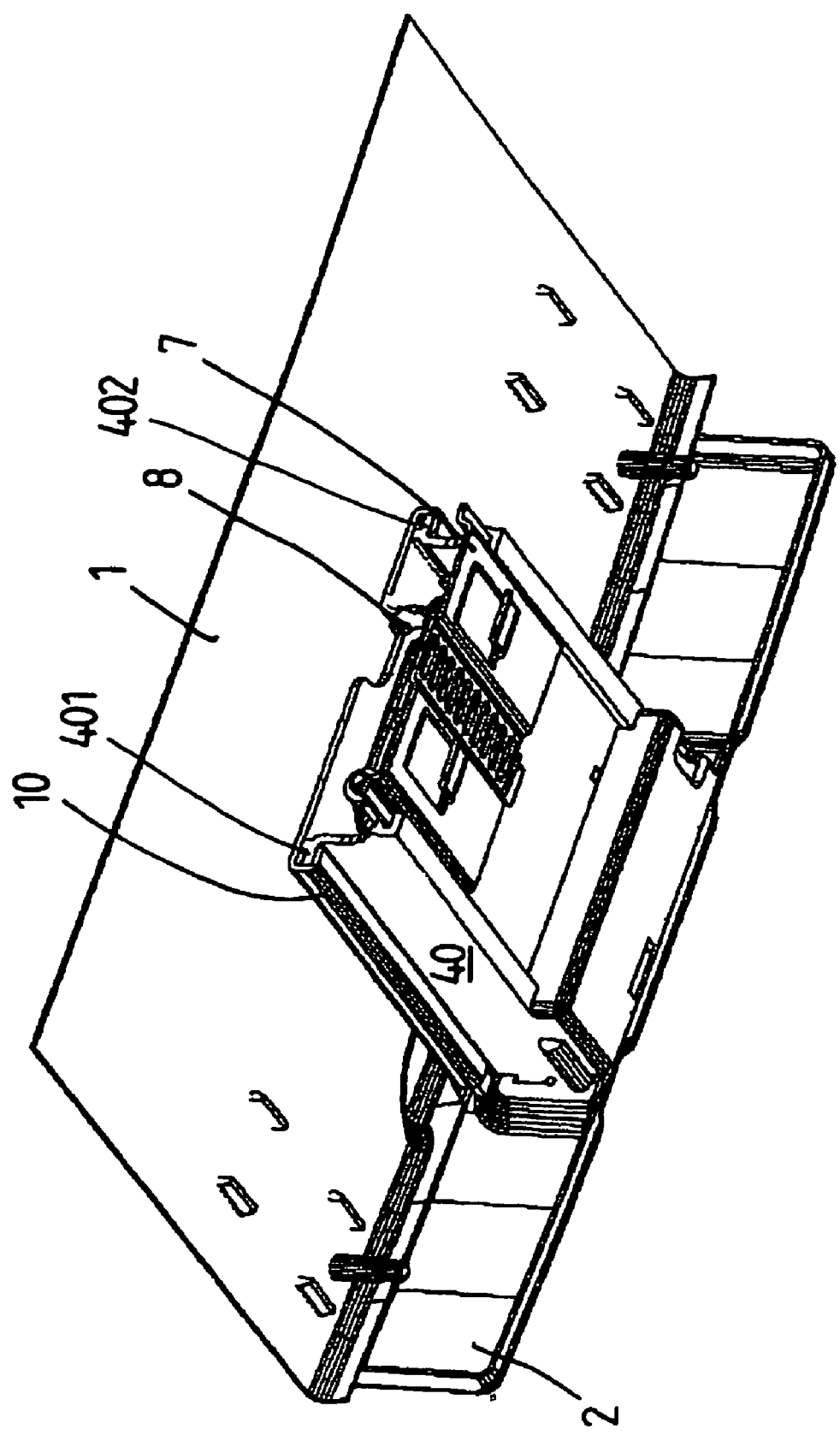
FIG. 8 shows an isometric view of the seat depth adjustment part, the guide plate and the adjusting unit from the underside, with the seat depth adjustment part retracted.
Figure 9:
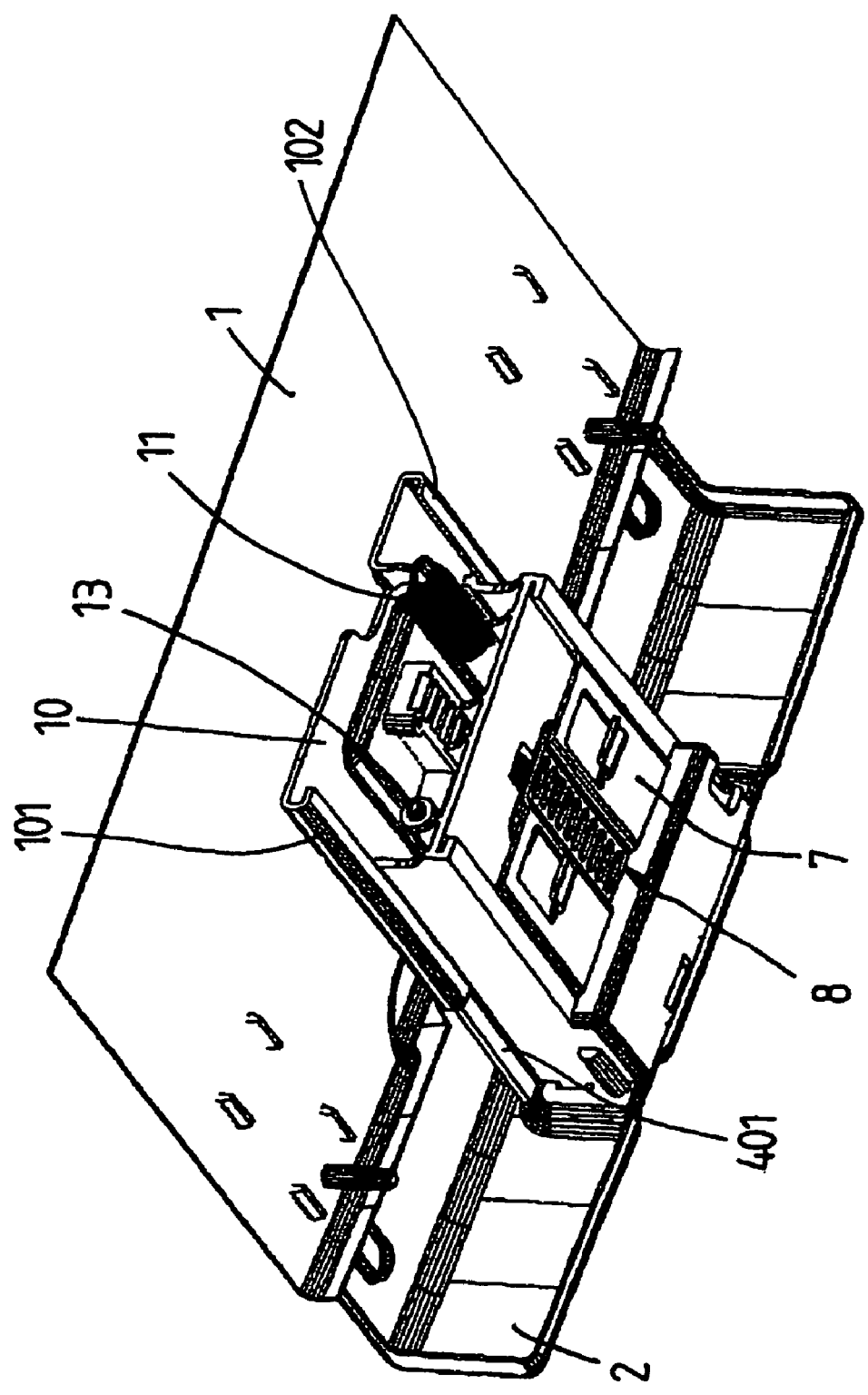
FIG. 9 shows an isometric view of the seat depth adjustment part, the guide plate and the adjusting unit from the underside, with the seat depth adjustment part extended.
Figure 10:
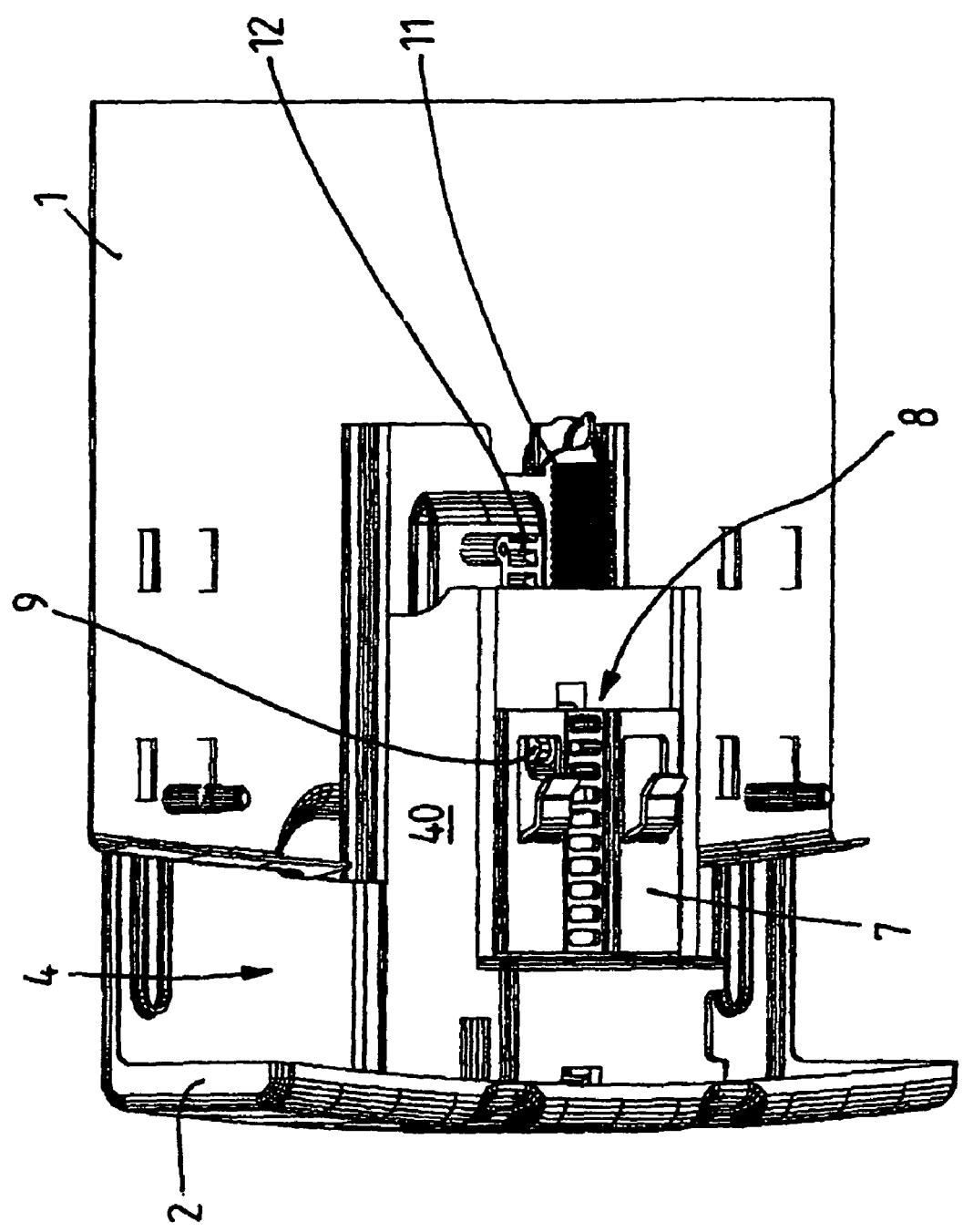
FIG. 10 shows an isometric view of the seat depth adjustment part, the guide plate and the adjusting unit from the underside, with the seat depth adjustment part extended.
Figure 11:
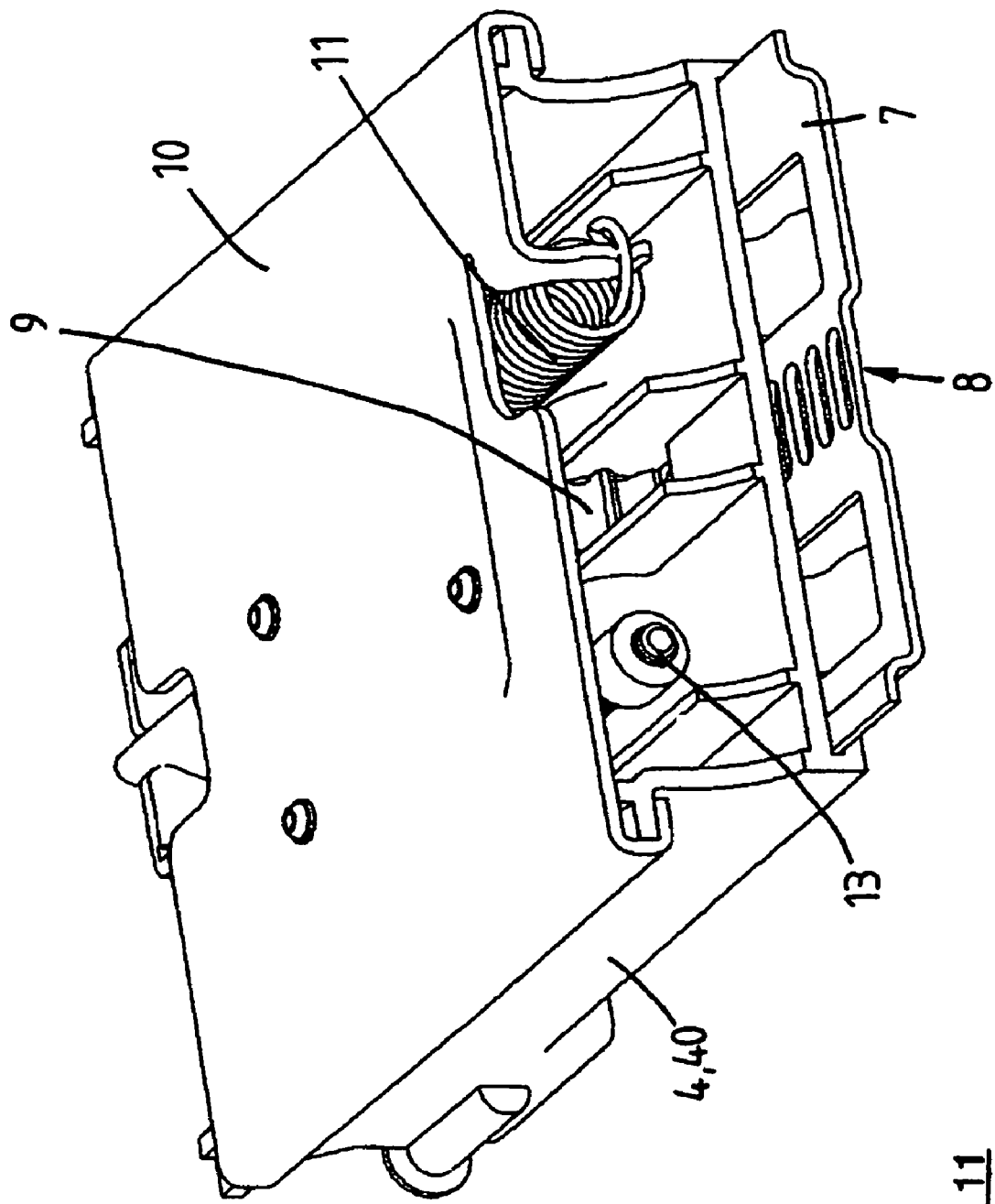
FIG. 11 shows an isometric view of the guide plate, the adjusting unit and parts of the adjusting mechanism of the seat depth adjuster.
Figure 12:
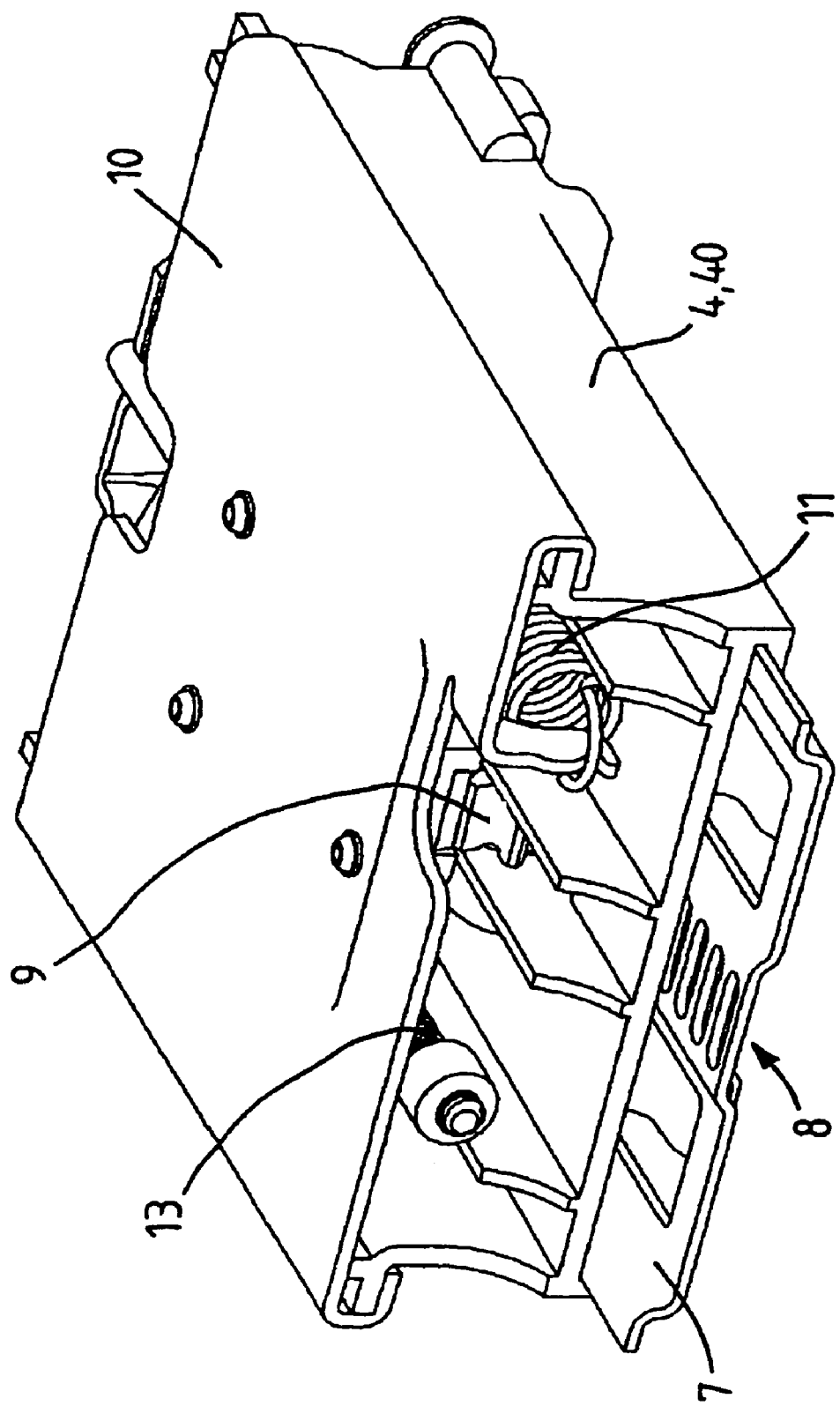
FIG. 12 shows an isometric view of the guide plate, the adjusting unit and parts of the adjusting mechanism of the seat depth adjuster.
Figure 13:
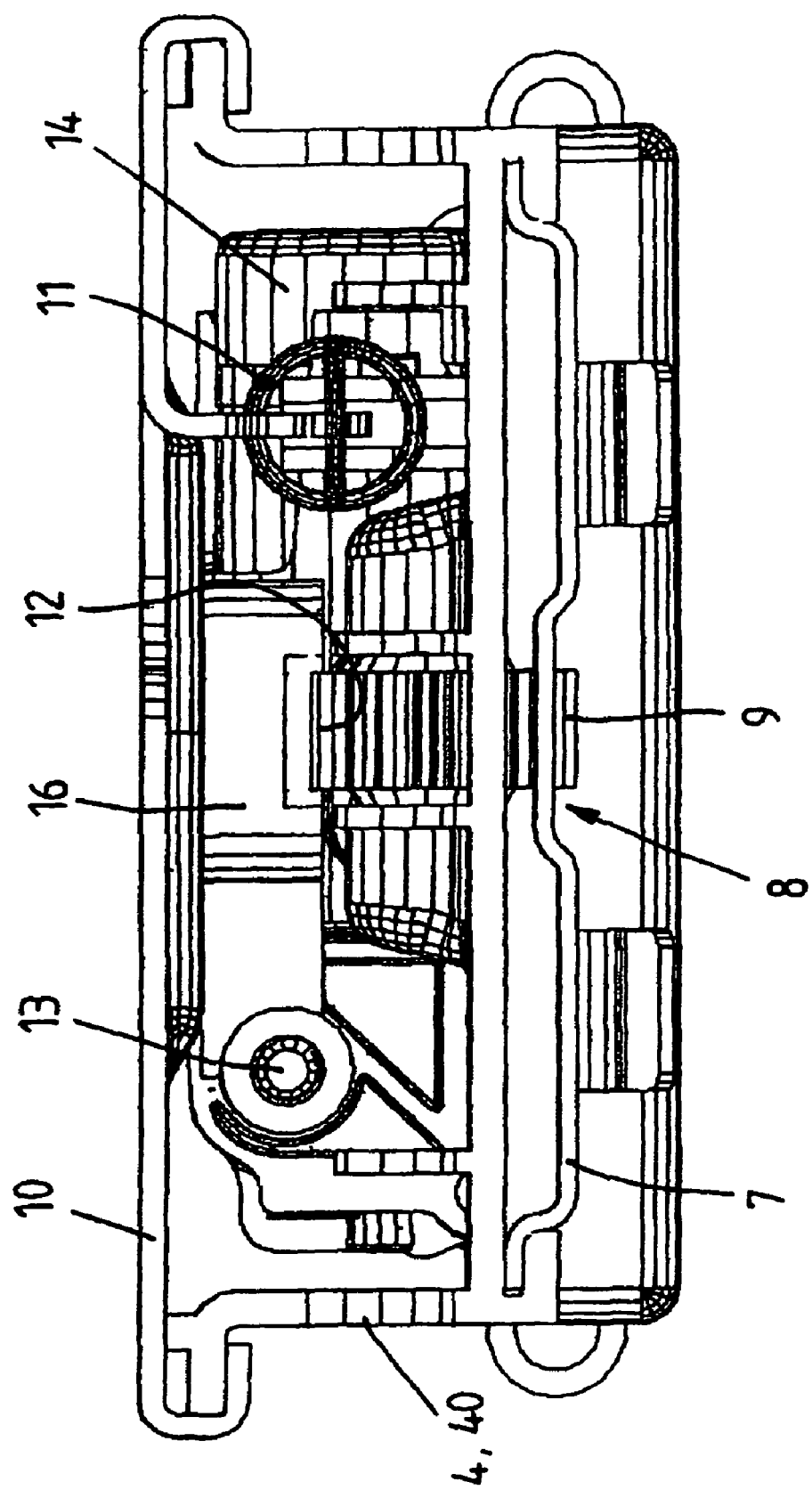
FIG. 13 shows a front view of the seat depth adjuster with the drive device of the adjusting unit.

The adjusting unit 4 adjusting the seat depth adjustment part 2 in the direction of the vehicle longitudinal axis relative to the seat pan 1 comprises according to FIG. 3 a housing 40, the front face thereof according to FIGS. 3 and 4 being connected via connecting elements 18 to the vertical adjustment part surface 22 of the seat depth adjustment part 2. A plate 7 of the guide device 5 for the cushion material guided in a linear manner on the underside of the housing 40 has a hole toothing 8 which meshes with a pinion 9 (FIGS. 3, 6, 7, 10, 12, 14, 16, 17) and from which two tabs 71, 72 are formed in which the rod 6 receiving the cushion material is suspended.

As may be seen from FIGS. 3 and 5 to 13, the housing 40 of the adjusting unit 4 is suspended in a linear displaceable manner on a guide plate 10 attached to the underside of the seat pan 1. To this end, the housing 40 at the upper ends of its side walls comprises bent-back projections 401, 402 (FIG. 9) which are encompassed by lateral guides 101, 102 of the guide plate 10 aligned in the direction of the vehicle longitudinal axis or X-axis, so that the housing 40 and thus the seat depth adjustment part 2 connected to the housing 40 may be displaced in the direction of the vehicle longitudinal axis or X-axis relative to the guide plate 10 connected to the seat pan 1.

The guide plate 10 additionally serves to link one end of a tension spring 11 (FIGS. 9 to 12) which is fastened to the housing 40 with its other end.

Figure 14:
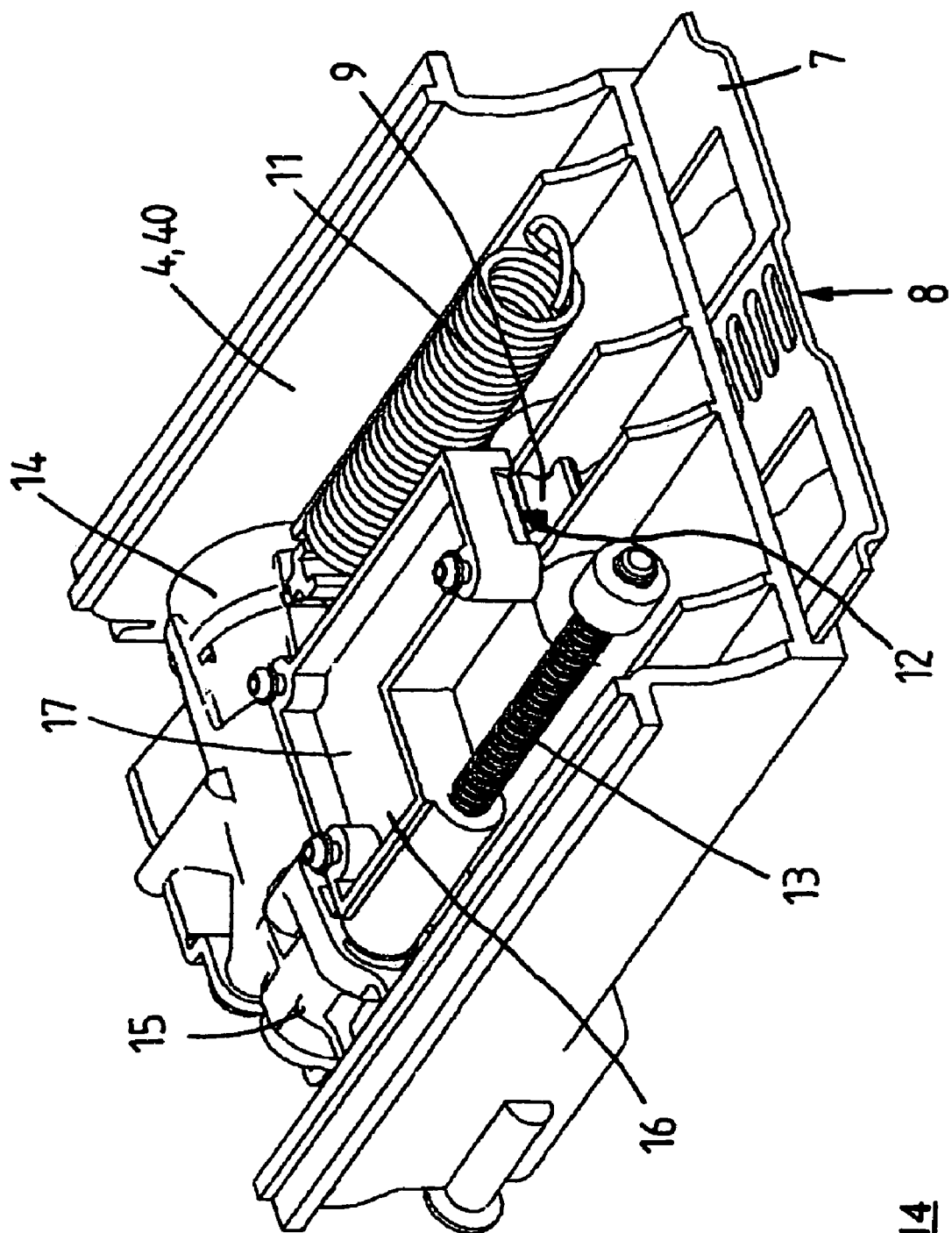
FIG. 14 shows an isometric view of the housing of the adjusting unit with the drive device of the adjusting unit arranged therein.
Figure 15:
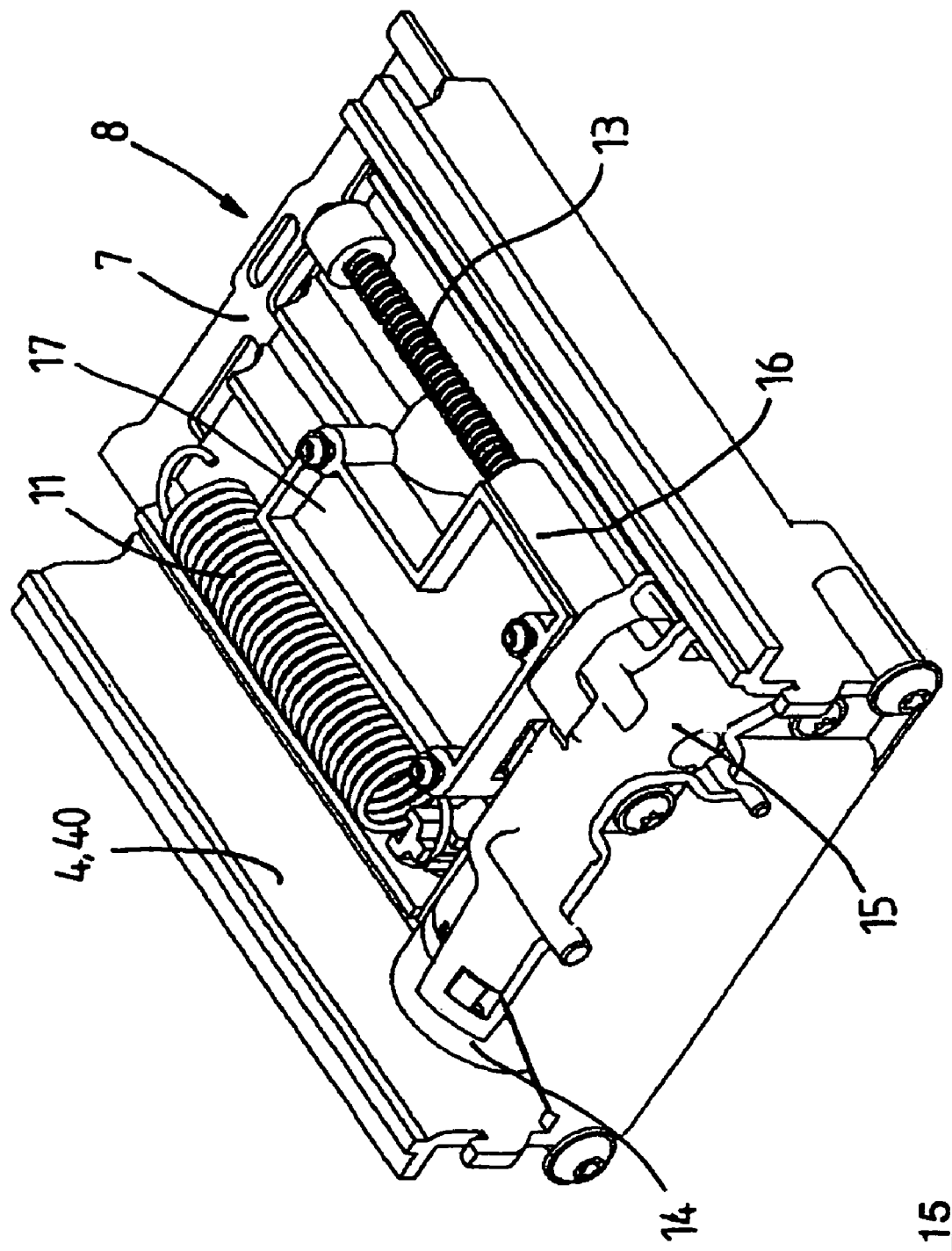
FIG. 15 shows an isometric view of the housing of the adjusting unit with the drive device of the adjusting unit arranged therein.
Figure 16:
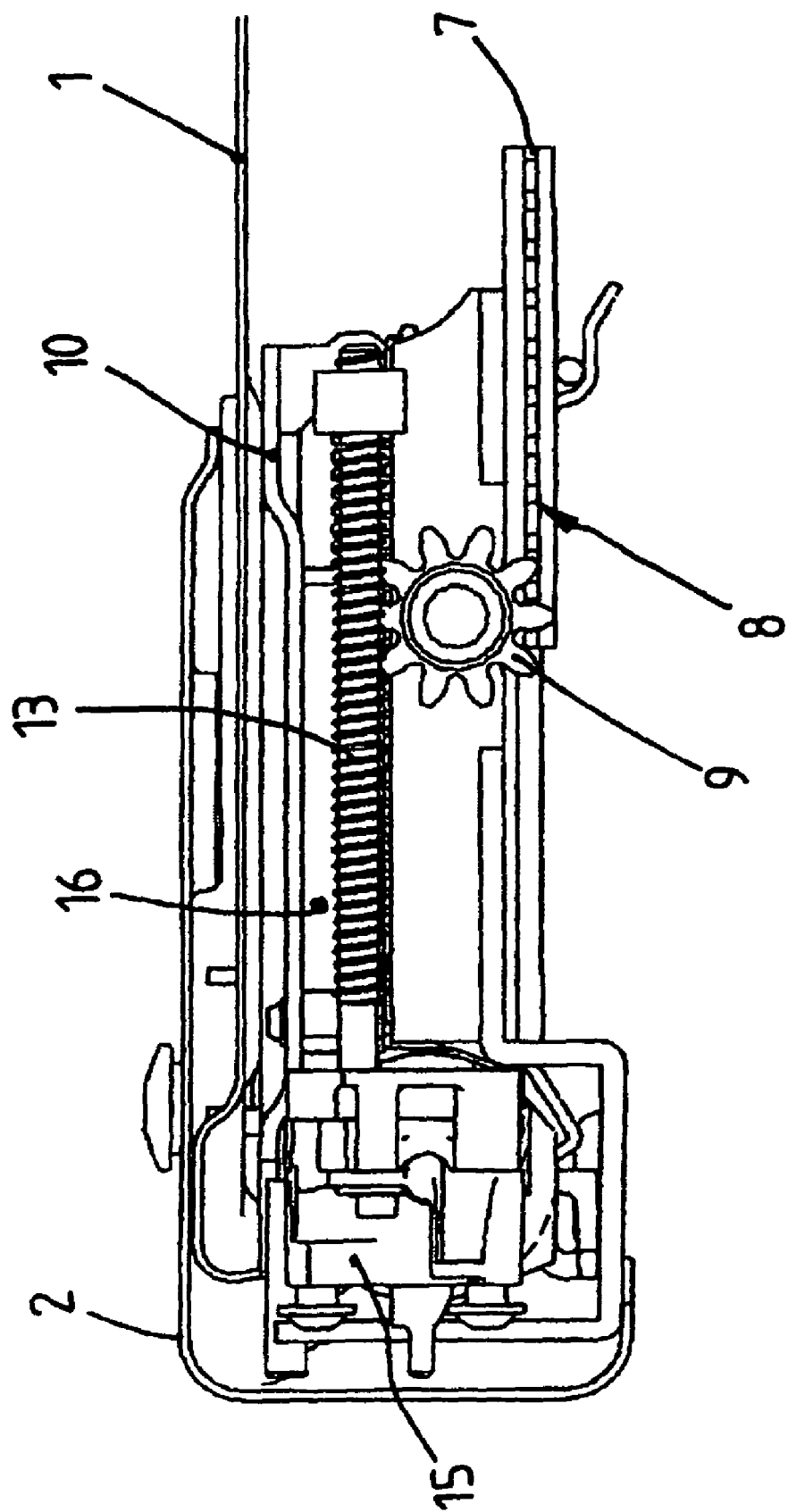
FIG. 16 shows a longitudinal section through the seat adjuster with the seat pan, the seat depth adjustment part, the drive device of the adjusting unit and the guide device for the cushion material with the seat depth adjustment part retracted and extended relative to the seat pan.
Figure 17:
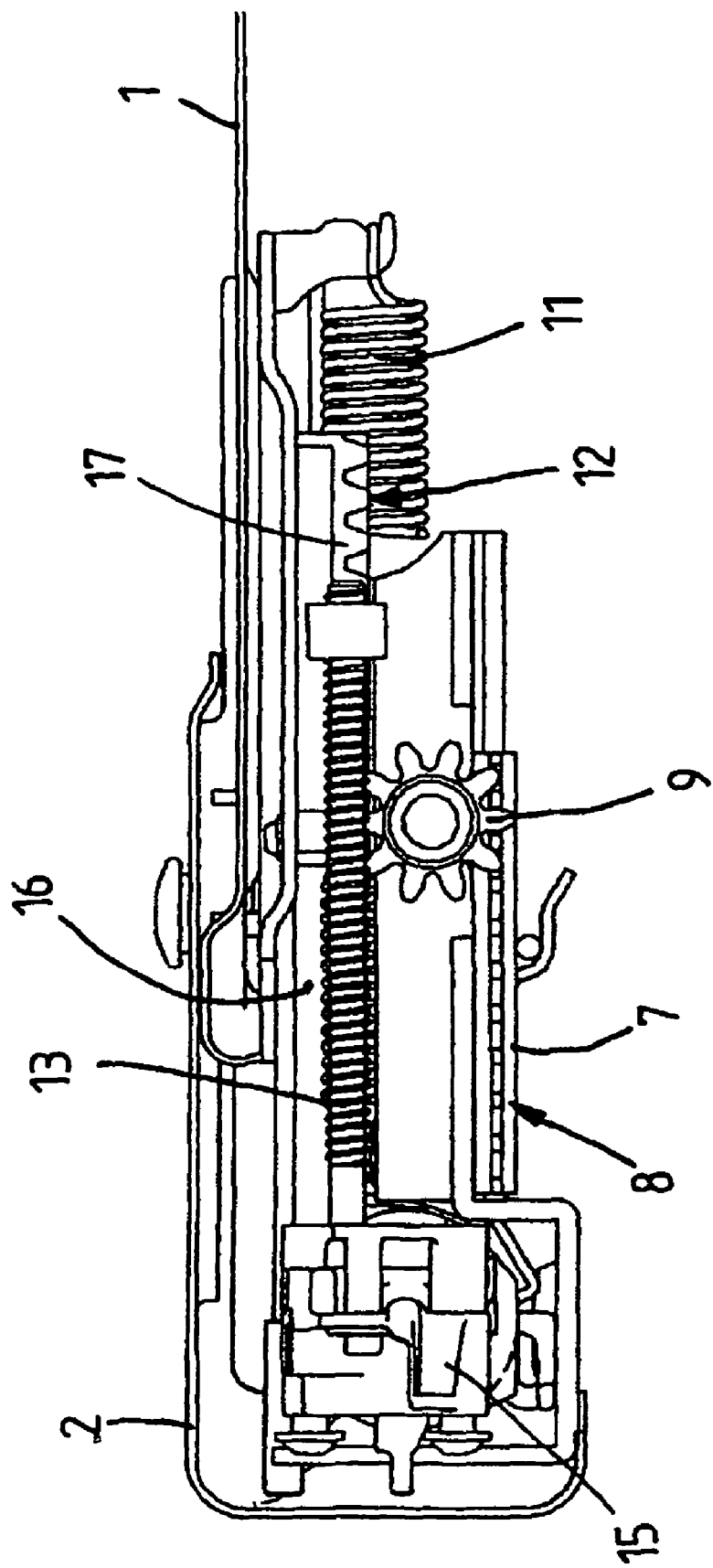
FIG. 17 shows a longitudinal section through the seat adjuster with the seat pan, the seat depth adjustment part, the drive device of the adjusting unit and the guide device for the cushion material with the seat depth adjustment part retracted and extended relative to the seat pan.

The drive device of the adjusting unit 4 contains a motor 14 attached to the floor of the housing 40 corresponding to FIGS. 13 to 17, which drives a spindle 13 via a gear mechanism 15 for moving the housing 40 and thus the seat depth adjustment part 2 connected to the housing 40 in the direction of the vehicle longitudinal axis and/or X-axis. The spindle 13 penetrates a spindle nut 16 which is arranged in a spindle nut receiver 17. The spindle nut receiver 17 is articulated on the guide plate 10 bearing in a longitudinally movable manner the housing 40 in the direction of the vehicle longitudinal axis or X-axis and further comprises on the side facing the pinion 9 fixed teeth 12 meshing with the pinion 9 (FIGS. 14 and 17).

When actuating the drive device of the adjusting unit 4 by activating the motor 14, the spindle 13 driven by the motor 14 via the gear mechanism 15 is displaced in one or the other direction in rotation, so that the spindle nut receiver 17, which contains the spindle nut 16, depending on the direction of rotation of the spindle 13 in one or the other direction is displaced in a linear manner in the direction of the vehicle longitudinal axis or X-axis. By the adjusting movement of the housing 40 of the adjusting unit 4 in the direction of the vehicle longitudinal axis or X-axis corresponding to FIGS. 16 and 17, as a result of the spindle nut receiver 17 connected to the guide plate 10 and the fixed teeth 12 configured on the spindle nut receiver 17, the pinion 9 is displaced in rotary motion so that the plate 7 of the guide device 5 for the cushion material guided in a linear manner on the underside of the housing 40, as a result of the engagement of the pinion 9 in the hole toothing 8 provided in the plate 7, covers double the path relative to the adjusting movement of the adjusting unit 4.

When extending the seat depth adjustment part 2, i.e. with the relative motion between the adjusting unit 4 connected to the seat depth adjustment part 2 relative to the guide plate 10 attached to the underside of the seat pan 1, the tension spring 11 is tensioned, so that it assists with the return of the seat depth adjustment part 2 into the retracted position or initial position and ensures that, even when it fails to run freely, the seat depth adjustment part 2 serving as an upper leg support is retracted and thus the minimal seat depth is ensured. Additionally, by means of the tension spring 11 possible tooth clearance between the pinion 9, the fixed teeth 12 and the hole toothing 8 is compensated.

The invention claimed is:

1. A device for adjusting seat depth of a motor vehicle seat comprising:
    a seat depth adjustment part movable relative to a seat lower part substantially in a direction of travel,
    an adjusting unit configured to move the seat depth adjustment part in relation to the seat lower part, the adjusting unit comprising a single housing attached in a linear movable manner beneath the seat lower part and being connected to the seat depth adjustment part, and a drive mechanism at least partly located inside the housing, and
    a guide device for cushion material covering the seat depth adjustment part,
    wherein the adjusting unit and the guide device for the cushion material form one unit, wherein the guide device is at least partially arranged within the housing.

2. The device of claim 1, wherein the seat depth adjustment part comprises a horizontal adjustment part surface extending in a plane defined by the vehicle longitudinal axis and the vehicle transverse axis, and a vertical adjustment part surface bent back substantially at right angles from a first adjustment part surface to extend in a plane defined by the vehicle transverse axis and the vehicle vertical axis, and wherein the seat vertical adjustment part surface is connected via connecting elements to the housing.

3. The device of claim 1, wherein the guide device for the cushion material is configured as a plate attached in a linear movable manner to an underside of the housing of the adjusting unit.

4. The device of claim 3, wherein the plate comprises a hole toothing which meshes with a pinion rotatably mounted in the housing.

5. The device of claim 4, wherein the pinion meshes with teeth fixed relative to the seat lower part, such that with a movement of the housing the pinion is rotated, and wherein by the engagement of the pinion in the hole toothing, the plate covers double the length of an adjusting path of the adjusting unit.

6. The device of claim 1, wherein the drive mechanism comprises a motor and a spindle, and wherein the housing of the adjusting unit is connected to the motor which drives the spindle adjusting the housing.

7. The device of claim 6, wherein the spindle cooperates with a spindle nut which is arranged in a spindle nut receiver attached to the seat lower part.

8. The device of claim 6, wherein fixed teeth are attached to the underside of the spindle nut receiver receiving the spindle nut.

9. The device of claim 1, wherein the housing of the adjusting unit is suspended in a guide plate attached below the seat lower part and guiding the housing in a direction of the vehicle longitudinal axis.

10. The device of claim 9, wherein the housing comprises bent-back projections at upper ends of its side walls, wherein the bent-back projections are encompassed by lateral guides of the guide plate aligned in the direction of the vehicle longitudinal axis.

11. A device for adjusting seat depth of a motor vehicle seat comprising:
    a seat depth adjustment part movable relative to a seat lower part substantially in a direction of travel,
    an adjusting unit adapted to move the seat depth adjustment part in relation to the seat lower part, the adjusting unit comprising a single housing attached in a linear movable manner beneath the seat lower part and being connected to the seat depth adjustment part, and
    a guide device for cushion material covering the seat depth adjustment part,
    wherein the adjusting unit and the guide device for the cushion material form one preassembled and independently functioning unit mounted to the motor vehicle seat.

* * * * *